United States Patent
Kim et al.

(10) Patent No.: US 8,699,082 B2
(45) Date of Patent: Apr. 15, 2014

(54) APPARATUS TO CONTROL PRINTING DENSITY IN IMAGE FORMING DEVICE AND METHOD THEREOF

(75) Inventors: Young Ju Kim, Suwon-si (KR); Bong Gi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1124 days.

(21) Appl. No.: 11/876,987

(22) Filed: Oct. 23, 2007

(65) Prior Publication Data

US 2008/0137115 A1 Jun. 12, 2008

(30) Foreign Application Priority Data

Dec. 12, 2006 (KR) ................. 2006-126381

(51) Int. Cl.
*G06K 15/00* (2006.01)
*G03G 15/06* (2006.01)
*B41J 2/06* (2006.01)

(52) U.S. Cl.
USPC ............ 358/3.1; 358/1.2; 358/1.9; 358/3.12; 358/3.23; 358/3.06; 399/9; 399/12; 399/27; 399/55; 347/55; 347/112

(58) Field of Classification Search
USPC ............ 358/1.9, 1.2, 1.5, 1.6, 3.02, 3.06, 3.1, 358/3.12, 3.23, 504, 522; 399/9, 27, 29, 49, 399/55, 74, 88, 139, 366; 347/55, 112, 129, 347/140, 240
See application file for complete search history.

(56) References Cited

U.S. PATENT DOCUMENTS

| | | | | |
|---|---|---|---|---|
| 5,502,550 A * | 3/1996 | Hori et al. | ........................ | 399/74 |
| 6,243,542 B1 * | 6/2001 | Fujimoto et al. | ................ | 399/49 |
| 6,642,942 B1 * | 11/2003 | Crook | ............................ | 715/744 |
| 6,642,943 B1 * | 11/2003 | Machida | ....................... | 715/763 |
| 6,967,730 B2 * | 11/2005 | Tomita | ......................... | 358/1.13 |
| 7,043,170 B2 * | 5/2006 | Ono et al. | ....................... | 399/45 |
| 7,355,741 B2 * | 4/2008 | Ishizaki | ........................ | 358/1.18 |
| 7,580,162 B2 * | 8/2009 | Kato | ............................. | 358/474 |
| 8,102,543 B2 * | 1/2012 | Tomomatsu | .................... | 358/1.1 |
| 2003/0107767 A1* | 6/2003 | Ishizaki | ........................ | 358/1.18 |
| 2004/0105102 A1* | 6/2004 | Tomomatsu | ................... | 358/1.1 |
| 2005/0254079 A1* | 11/2005 | Han | .............................. | 358/1.13 |
| 2007/0211262 A1* | 9/2007 | Kimoto et al. | ................. | 358/1.1 |

FOREIGN PATENT DOCUMENTS

| | | |
|---|---|---|
| JP | 1067134 | 3/1998 |
| JP | 2004-56252 | 2/2004 |
| KR | 1020050103833 | 11/2005 |

* cited by examiner

*Primary Examiner* — Steven Kau
(74) *Attorney, Agent, or Firm* — Stanzione & Kim, LLP

(57) ABSTRACT

An apparatus to control a printing density in an image forming device and a method thereof, capable of controlling the printing density of a printed matter according to an amount of pages for a single page and a print rate. The apparatus and method solve a problem wherein the printing density is recognized as being degraded due to an increase of pages for a single paper or a reduced print rate. The printing density is set automatically or manually, and a bias voltage applied to a developing roller is controlled according to set-up information so that the printing density is controlled.

17 Claims, 12 Drawing Sheets

APPARATUS TO CONTROL PRINTING DENSITY IN IMAGE FORMING DEVICE AND METHOD THEREOF

CROSS-REFERENCE TO RELATED APPLICATIONS

This application claims the benefit of Korean Patent Application No. 2006-126381, filed on Dec. 12, 2006, in the Korean Intellectual Property Office, the disclosure of which is incorporated herein by reference in its entirety.

BACKGROUND OF THE INVENTION

1. Field of the Invention

The present general inventive concept relates to an apparatus to control a printing density in an image forming device and a method thereof, capable of controlling the printing density according to one or more printing conditions which are set by a user.

2. Description of the Related Art

An image forming device connected to a host computer outputs documents or other data prepared through an application program of a computer, and allows a user to set up a print range, copies of printed matters, an amount of pages for a single paper and a print rate based on documents or other data prepared in the host computer. The amount of pages for a single paper is for setting the amount of print matters to be printed on a single paper, and the print rate is for setting the size of the print matter to be output using a numerical value.

For instance, when the amount of pages for a single paper and the print rate are set to an initial value using a user interface in a print job, a character "A" 11 is output on a medium 10, as shown in FIG. 1A. If four pages are set for a single paper using a user interface, the character "A" 21 is output in an upper left side of a single paper 20 divided into four equal parts, as shown in FIG. 1B. Further, when the print rate is set with a smaller level using a user interface in a print job, the character "A" 31 is output on a medium 30 with the size reduced according to the print rate, as shown in FIG. 1C.

As described above, when the amount of pages for a single paper increase or the print rate is reduced in the print job, although the printing density is not changed, the printing density is perceived as being decreased. That is, although the same printing density is applied to the print matter, since the size of the print matter displayed on a sheet of paper is decreased, the user may perceive that the printing density of the print matter is decreased. Accordingly, readability and/or clarity for the print matter having a reduced size is degraded.

SUMMARY OF THE INVENTION

The present general inventive concept provides an apparatus to control a printing density in an image forming device and a method of automatically controlling the printing density according to the amount of pages for a single paper and the print rate, or manually controlling the printing density according to the setup of a user.

Additional aspects and utilities of the present general inventive concept will be set forth in part in the description which follows and, in part, will be obvious from the description, or may be learned by practice of the general inventive concept.

The foregoing and/or other aspects of the present general inventive concept may be achieved by providing an apparatus to control a printing density in an image forming device. The apparatus including a user interface to set one or more printing conditions and a printing density, a controller to convert print data according to the printing conditions and to provide set-up information of the printing density, a print engine section to perform a print job and thereby form an image on a printing medium according to the converted print data and to output a printing density control signal and thereby control the printing density according to the set-up information of the printing density, and a developing device to develop an image by adjusting an amount of toner according to the printing density control signal of the print engine section.

The user interface may be connected to a printer driver using an application program of a host computer.

The printing density may be manually set through the user interface by a user independent from the printing conditions.

The printing density may be automatically set through the user interface either according to a setup of either a print rate, or an amount of pages for a single paper.

The printing density may be set according to an amount of pages and the printing density increased corresponding to an increased amount of pages.

A set-up range of the printing density may be restricted by taking readability and/or clarity of a printed matter into consideration.

The developing device may further include a high voltage power supply to supply a bias voltage to a developing roller, wherein the developing device adjusts the printing density by varying the bias voltage applied to the developing roller.

The foregoing and/or other aspects of the present general inventive concept may also be achieved by providing an apparatus including a host computer to provide a user interface to set a printing condition, a printing density, and either an automatic printing density setting whereby the printing density is set according to the printing condition or a manual printing density setting whereby the printing density is set by a user independent from the printing condition, and a print device to perform a print job according to the printing condition while varying a bias voltage applied to a developing roller of a developing device according to the automatic printing density setting or the manual printing density setting.

The foregoing and/or other aspects of the present general inventive concept may also be achieved by providing a method of controlling a printing density in an image forming device, the method including setting a printing condition using a user interface, automatically setting the printing density based on the printing condition, and outputting a printed matter by controlling a bias voltage of a developing device according to the printing density.

The printing density may be set higher as the amount of pages for a single paper becomes increased or the print rate becomes reduced, and a set-up range of the printing density may be restricted by taking readability and/or clarity of a printed matter into consideration.

The user interface may be connected to a printer driver using an application program of a host computer.

The foregoing and/or other aspects of the present general inventive concept may also be achieved by providing a method of controlling a printing density in image forming device, the method including setting a printing condition using a user interface, setting the printing density separately or independent from the printing condition, and outputting a printed matter by controlling a bias voltage of a developing device according to the printing density which is manually set.

The setting of the printing condition may include setting the printing condition according to the amount of pages for a single paper or a level of the print rate as the printing condition.

The foregoing and/or other aspects of the present general inventive concept may also be achieved by providing a computer readable recording medium containing computer readable codes as a program to execute a method of controlling a printing density in an image forming device, the method comprising setting a printing condition using a user interface, setting the printing density, and outputting a printed matter by controlling a bias voltage of a developing device according to the printing density.

The setting of the printing density may be automatically set based on the printing condition.

The setting of the printing density may be set independent from the printing condition.

The foregoing and/or other aspects of the present general inventive concept may also be achieved by providing an apparatus to control a printing density of an image forming system, the apparatus including a host computer to set one or more printing conditions and a printing density, to convert print data according to the printing conditions, to provide set-up information of the printing density, and to output a printing density control signal to control the printing density of an image according to the set-up information of the printing density.

The host computer may further include a user interface to generate a window through which the one or more printing conditions and the printing density are set, and a controller to convert print data according to the printing conditions and to provide set-up information of the printing density so that a printing density control signal is output to control the printing density of an image according to the set-up information of the printing density.

The foregoing and/or other aspects of the present general inventive concept may also be achieved by providing an apparatus to control a printing density, the apparatus including a print device to receive print data and set-up information on a printing density of an image, and to perform a print job according to the print data and the set-up information The printing density may be set according to a setup of a print rate and the printing density may be increased correspondingly to an increased amount of pages.

A set-up range of the printing density may be restricted based on readability and/or clarity of a printed matter.

The print device may further include a print engine section to perform the print job and thereby form the image on a printing medium and to output a printing density control signal and thereby control the printing density according to the set-up information of the printing density, and a developing device to develop the image by adjusting an amount of toner according to the printing density control signal of the print engine section.

A print data controller may convert print data and provide set-up information.

The apparatus to control a printing density may also include a host computer connected to the print device to automatically set the printing density according to print range.

The apparatus to control a printing density may also include a host computer connected to the print device to automatically set the printing density according to one or more copies of printed matters on a printing medium.

The apparatus to control a printing density may also include a host computer connected to the print device to automatically set the printing density according to a number of pages for one print job.

The apparatus to control a printing density may also include a host computer connected to the print device to automatically set the printing density according to print rate.

The apparatus to control a printing density may also include a host computer connected to the print device to set the printing density manually by a user.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
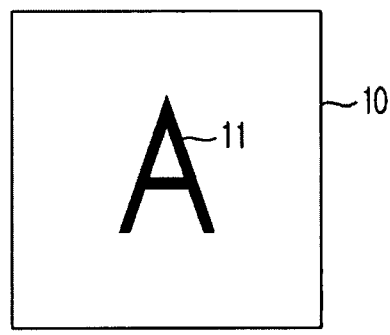
FIG. 1A is a view illustrating an original printed matter.
Figure 1B:
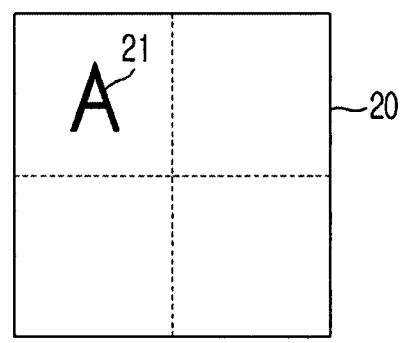
FIG. 1B is a view illustrating a printed matter divided into four equal parts when 4 pages are set for a single paper.
Figure 1C:
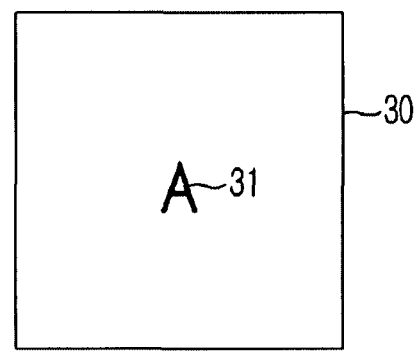
FIG. 1C is a view illustrating a printed matter when the print rate is set to a low level.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
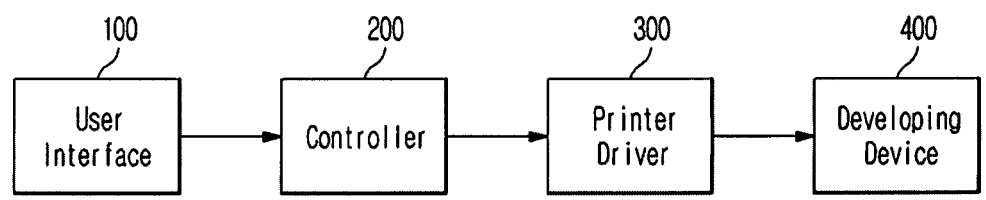
FIG. 2 is a block diagram schematically illustrating a configuration of an apparatus to control a printing density in an image forming device according to an embodiment of the present general inventive concept.

An apparatus to control a printing density in an image forming device according to an embodiment of the present general inventive concept by setting one or more printing conditions using a user interface 100, as illustrated in FIG. 2.

The user interface 100 is used to set the printing conditions, which may include a print range, one or more copies of printed matters, an amount of pages for a single paper and/or a print rate. In this case, the user interface 100 can use various interface units which allow a user to set the printing condition(s). The printing condition(s) may be set by using a printer interface device such as a printer driver provided in a host computer or by using a main body of a printer or other image forming device.

The printing density for the printed matter is set by the user interface 100 through the following two methods. One is a manual setting method in which the user directly sets up the printing density independently from the operation of the user interface 100 in order to set the amount of pages and the print rate. The other is an automatic setting method in which the printing density is automatically set as the amount of pages or the print rate is set through the user interface 100.

According to the manual setting method, the user has to manually set the printing density, but can obtain desired printing density as required in order to satisfy a printing state of the printed matter. According to the automatic setting method, the printing density is automatically set depending on the amount of pages for a single paper or the print rate based on data obtained through various tests so as to compensate for the phenomenon in which the printed matter is unclear, thereby allowing the convenience of use and overall efficiency to be improved.

After the printing density is manually set or automatically set through the user interface 100, such set-up information of the printing density is transmitted to a printer engine section or printer driver 300 through a controller 200. The print driver 300 applies a print density control signal to a developing device 400 so as to control the printing density of an image printed on a printing medium by the developing device 400 according to the set-up information of the printing density.

The user interface 100, the controller 200 and the printer driver 300 may constitute a computer to communicate with the developing device 400 to form or print an image on a printing medium.

The developing device 400 controls the printing density of the printed matter according to the print density control signal.

A host computer 500 can be used as the user interface 100. An example of using the host computer 500 is illustrated in FIG. 3.

Figure 3:
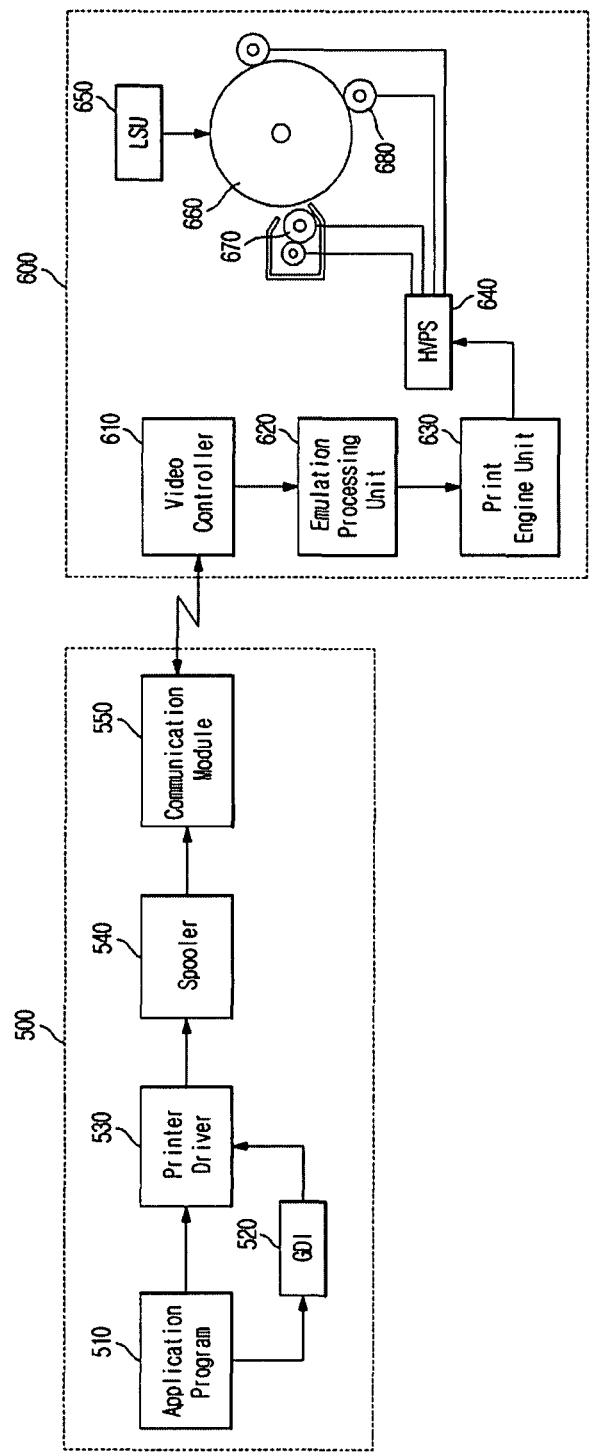
FIG. 3 is a detailed view illustrating a case in which a host computer is used as an example of a user interface according to an embodiment of the present general inventive concept.

As illustrated in FIG. 3, a print device 600 is connected to the host computer 500. The host computer 500 includes an application program 510, a graphics device interface (GDI) 520, a printer driver 530, a spooler 540, and a communication module 550.

The application program 510 provides a graphic screen to request the printer driver 530 to set up the printing condition(s). For instance, FIG. 4A illustrates a graphic screen 110 to set the amount of pages for a single paper, FIG. 4B illustrates a graphic screen 120 to set the print rate, and FIG. 4C illustrates a graphic screen 130 to set the printing density.

Figure 4A:
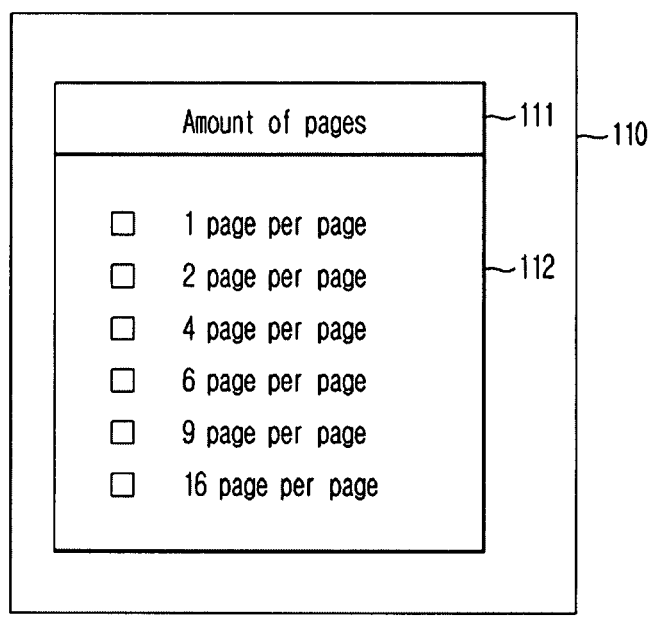
FIG. 4A is a view illustrating a graphic screen to set an amount of pages for a single paper according to an embodiment of the present general inventive concept.

The graphic screen 110 illustrated in FIG. 4A includes a head portion 111 to display a menu to set an amount of pages and a body portion 112 to display a list of pages for a single paper.

Figure 4B:
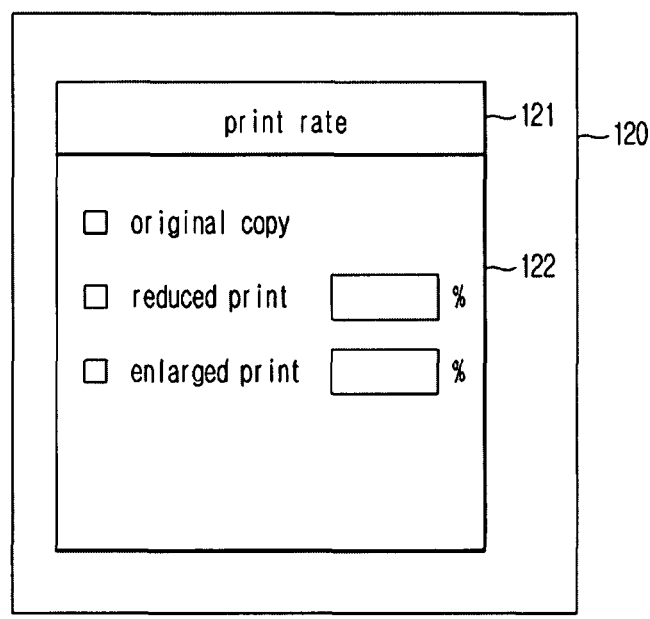
FIG. 4B is a view illustrating a graphic screen to set a print rate according to an embodiment of the present general inventive concept.

The graphic screen 120 illustrated in FIG. 4B includes a head portion 121 to display a menu to set a print rate and a body portion 122 to display a list of the print rates.

Figure 4C:
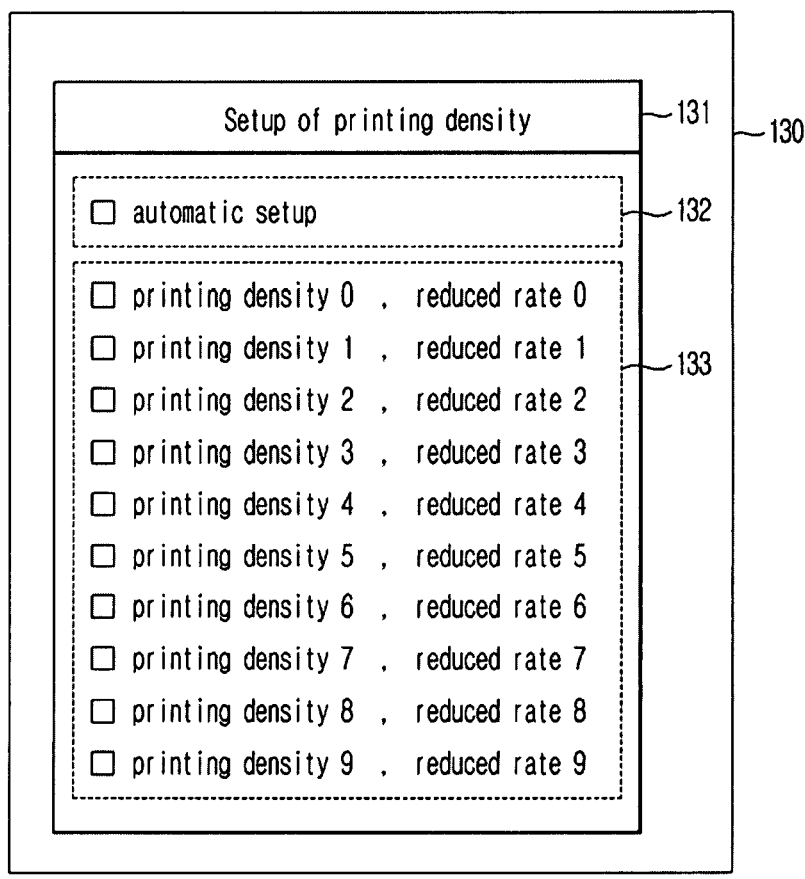
FIG. 4C is a view illustrating a graphic screen to set a printing density according to an embodiment of the present general inventive concept.

After the amount of pages for a single paper or the print rate is selectively set, the user can set the printing density of the printed matter through the graphic screen 130 illustrated in FIG. 4C.

The graphic screen 130 illustrated in FIG. 4C includes a head portion 131 to display a menu to set the printing density, a middle portion 132 to display a message in support of the automatic setting of the printing density, and a body portion 133 to display a list of the printing density.

After the user selectively sets up the amount of pages for a single paper or the print rate as illustrated in FIG. 4A or FIG. 4B, if the user elects to automatically set the printing density based on such set-up information, the user must select a box of the middle portion 132 to assign the automatic setting. In contrast, if the user elects to directly set the printing density, the user must select a corresponding box displayed in the body portion 133 to specify the printing density required by the user.

Such information, which is set through the graphic screens 110, 120 and 130, is transmitted to the printer driver 530.

A printing command for print data provided through the application program 510 is converted into an object by the GDI 520, so as to be transmitted to the printer driver 530.

The printer driver 530 converts the printing command, which has been converted into the object, and then transmits the printing command to the spooler 540. At this time, the set-up information about the printing density is also transmitted to the spooler 540.

In this case, rendering and half tone processes for the print data can be performed according to the amount of pages for a single paper and the print rate set in the printer driver 530. However, these processes are optional processes. That is, the rendering and half tone processes for the print data can be performed in the print device 600, which will be described below.

The spooler 540 transmits the printing command and the set-up information of the printing density received through the printer driver 530 to the print device 600 using the communication module 550.

A video controller 610 of the print device 600 converts the printing command received from the spooler 540 into bitmap data, and outputs the bitmap data to an emulation processing unit 620. The emulation processing unit 620 emulates the bitmap data and provides a print engine section or print engine unit 630 with the emulated data for the print job. In addition, the emulation processing unit 620 provides the print engine unit 630 with an engine command corresponding to the printing density.

The print engine unit 630 interprets the engine command and applies the print density control signal to a High Voltage Power Supply (HVPS) 640 such that a bias voltage corresponding to the printing density can be applied to a developing roller 670.

The HVPS 640 controls the bias voltage applied to the developing roller 670. In this case, the bias voltage is variable corresponding to the printing density.

The amount of toner to be provided is variable according to the voltage applied to the developing roller 670 so as to control the printing density.

An electrostatic latent image formed on a photo conductive drum 660 by the light of an exposure device or Laser Scanning Unit (LSU) 650 is developed into a toner image using the developing roller 670, and is transferred by a transfer roller 680.

Figure 5A:
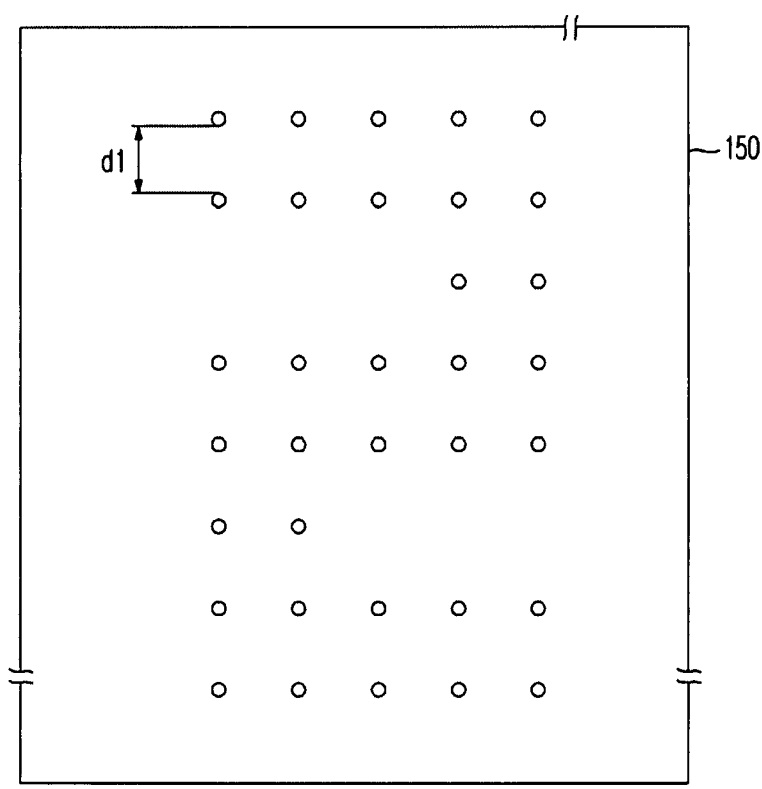
FIG. 5A is a view illustrating an example of an ordinary printed matter obtained when the printing density is not adjusted.
Figure 5B:
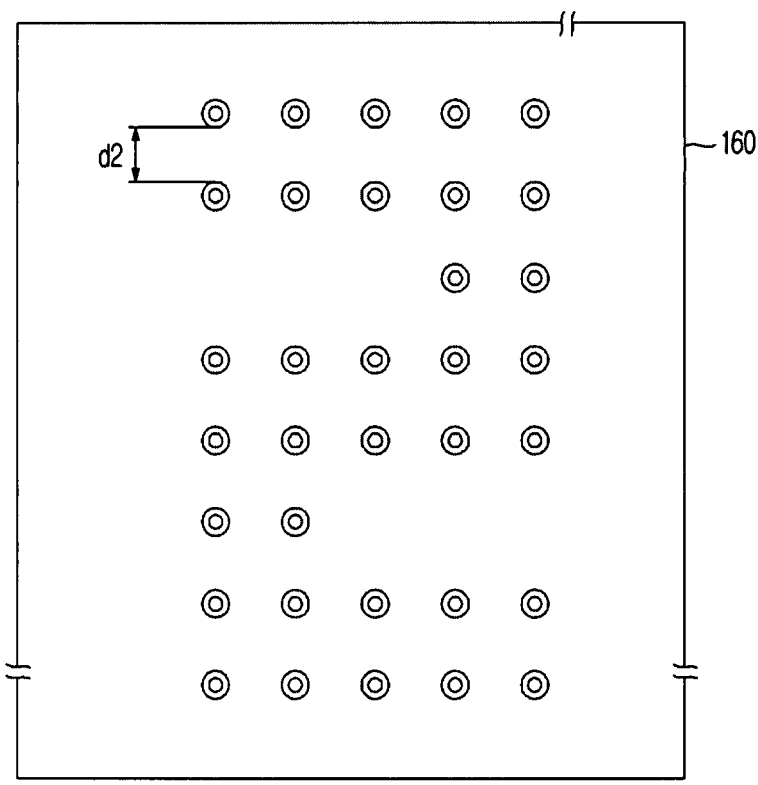
FIG. 5B is a view illustrating an example of another printed matter obtained when the printing density is adjusted by taking the amount of pages for a single paper or the print rate into consideration, in which an interval between pixels is narrower than that of the related art.

In the case of reduced printing, in which the amount of pages or the print rate is reduced, the printing density can be adjusted by controlling the bias voltage applied to the developing roller 670. Thus, readability and/or clarity of the printed matter having a reduced size can be improved by controlling the bias voltage. For instance, a pixel interval d2 of the printed matter illustrated in FIG. 5B, which is printed on a medium 160 by taking the amount of pages for a single paper or the print rate into consideration, is narrower than a pixel interval d1 of the ordinary printed matter in which the printing density is not adjusted as shown on a medium 150 in FIG. 5A, so that the printing density is increased. Accordingly, the degradation of the printing density perceived by the user in the printing job can be prevented.

Figure 5C:
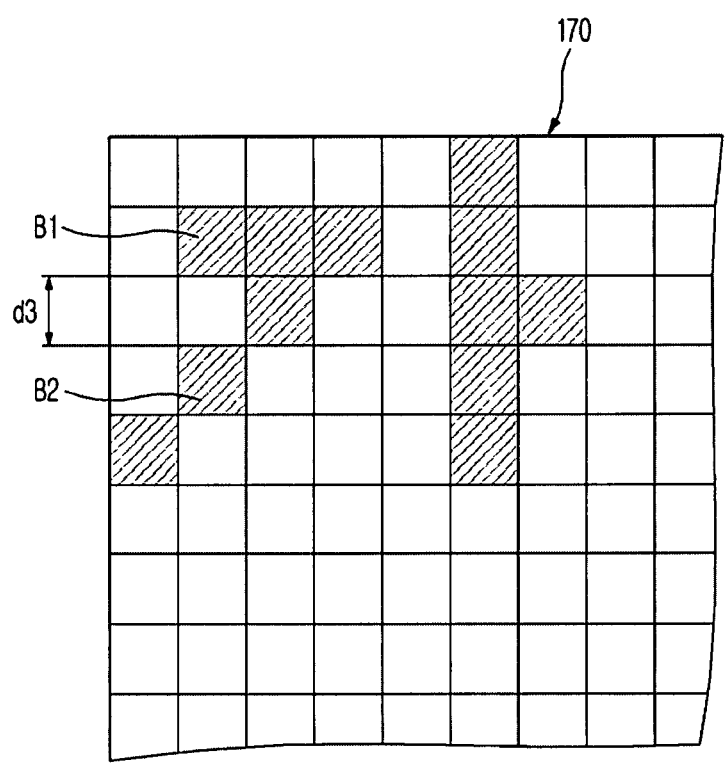
FIG. 5C is a view illustrating an example of a printed matter having a margin between blocks forming an image.
Figure 6:
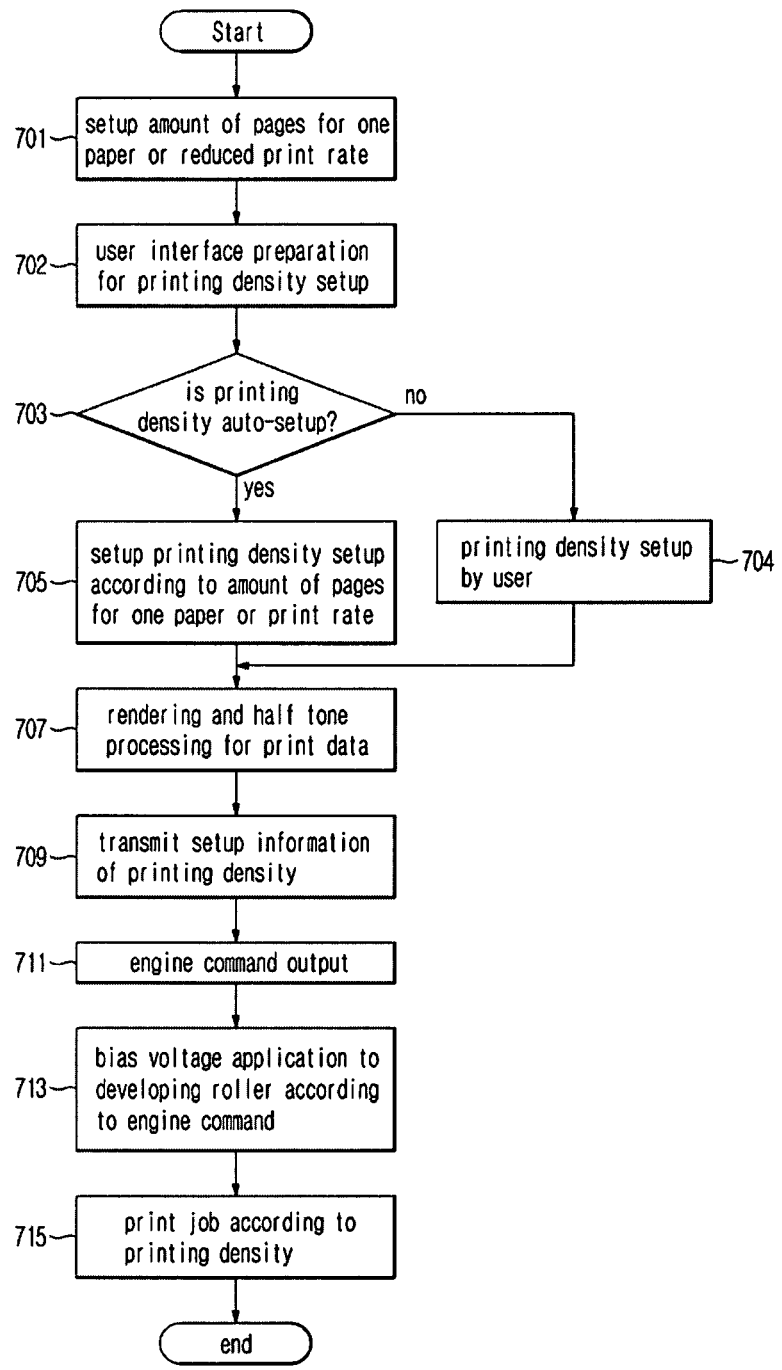
FIG. 6 is a flowchart illustrating a method to control a printing density according to an embodiment of the present general inventive concept.

With respect to controlling the printing density, if the printing density is excessively increased, the readability and/or clarity of the original copies may be degraded. For instance in FIG. 5C, an interval d3 between one block B1 and another block B2 on a medium 170, which form an image, must be ensured as a margin. However, if the margin is printed to increase the printing density, the original image can not be easily read. Accordingly, a test is performed to obtain an optimum range for controlling the printing density according to the types and characteristics of a printing medium such as a sheet of paper, and the printing density is set within an optimum range obtained by the test. Such a set-up result is applied to the user interface 100.

Hereinafter, a method of controlling a printing density in an image forming device having the above configuration will be explained with reference to FIGS. 2-6.

First, the printing condition(s) are set using the user interface 100. At this time, the amount of pages for a single paper or the print rate is set (operation 701). For the purpose of convenience, the reduced printing, in which the amount of pages for a single page is set to a numerical value of at least 2 or the print rate is set to a low level, is adopted as an example.

After that, the user interface 100 allows a user to set the printing density of the printed matter (operation 702). For instance, the automatic setting method or the manual setting method can be selected in operation 702.

Then, it is determined whether the printing density is automatically set (operation 703). If it is determined that the printing density is not automatically set, then the user selects a desired printing density from among the list of the printing density (operation 704). If it is determined that the automatic setting for the printing density is selected, the printing density is automatically set according to the amount of pages for a single paper or the print rate (operation 705).

After that, the rendering and/or half tone processes for the print data are performed according to the amount of pages for a single paper or the print rate (operation 707). Then, the set-up information of the printing density is transmitted to the print device (operation 709). The print device interprets the set-up information of the printing density, and outputs the engine command corresponding to the set-up information (operation 711). Then, the bias voltage corresponding to the engine command is applied to the developing roller of the developing device (operation 713). Accordingly, the print job is performed with the printing density, which is set according to the amount of toner in the developing roller (operation 715).

Various embodiments of the present generally inventive concept can be embodied as computer readable codes on a computer readable recording medium. The computer readable recording medium may include any data storage device suitable to store data that can be read by a computer system. A non-exhaustive list of possible examples of computer readable recording mediums include read-only memory (ROM), random-access memory (RAM), CD-ROMS, magnetic tapes, floppy disks, optical storage devices, and carrier waves, such as data transmission via the internet. The computer readable recording medium may also be distributed over network-coupled computer systems so that the computer readable code is stored and executed in a distribution fashion. Various embodiments of the present general inventive concept may also be embodied in hardware, software or in a combination of hardware and software. For example, the user interface 100, controller 200 and printer driver 300 and/or functions thereof may be embodied in software, in hardware or in a combination thereof. In various embodiments, the controller 200 and printer driver 300 and/or functions thereof may be embodied as computer readable codes on a computer readable recording medium to perform tasks such as file and/or data transmission operations, such as data transmission operations illustrated in FIG. 6. Further, in various embodiments, the controller 200 and printer driver 300 and/or functions thereof may be embodied as computer readable codes on a computer readable recording medium to perform tasks such as file and/or data reception operations, such as data reception operations illustrated in FIG. 6. Still further, the controller 200 and printer driver 300 and/or functions thereof may be embodied as computer readable codes on a computer readable recording medium to perform tasks such as displaying and/or printing operations, such as the data displaying and printing operations illustrated in FIG. 6.

As described above and according to the present general inventive concept, the printing density of the printed matter can be controlled according to the printing condition(s) including the amount of pages for a single paper and/or the print rate, so that the phenomenon in which the image density is perceived as being degraded in the reduced print can be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling a printing density in an image forming device, the method comprising:
    displaying a graphic screen of a printing density setting method including an automatic setting method and a manual setting method using a user interface of a host computer;
    setting a printing condition to control display of a printing matter;
    determining whether a printing density setting method is at least one of the automatic setting method and the manual setting method;
    automatically setting the printing density of the printing matter to be displayed according to at least one of an amount of pages of a single paper and a print rate so that a pixel interval of the printing matter is changed when the printing density setting method is the automatic setting method;
    manually setting the printing density of the printing matter to be displayed from among a list of the printing density by a user when the printing density setting method is the manual setting method;
    outputting the printing matter by controlling a bias voltage of a developing device according to the printing density.

2. The method as set forth in claim 1, further comprising:
    setting the printing density correspondingly higher as the amount of pages for a single paper becomes increased or the print rate becomes reduced; and
    restricting a set-up range of the printing density based on maximum and minimum printing densities that can be used without adversely affecting clarity of the printing matter.

3. The method as set forth in claim 2, further comprising:
    connecting the user interface to a printer driver using an application program of a host computer.

4. A method of controlling a printing density in an image forming device, the method comprising:

displaying a graphic screen of a printing density setting method including an automatic setting method and a manual setting method using a user interface of a host computer;

setting a printing condition to control display of a printing matter;

determining whether a printing density setting method is at least one of the automatic setting method and the manual setting method;

automatically setting the printing density of the printing matter to be displayed according to at least one of an amount of pages of a single paper and a print rate so that a pixel interval of the printing matter is changed when the printing density setting method is the automatic setting method;

setting the printing density of the printing matter to be displayed independent from the printing condition when the printing density setting method is the manual setting method; and outputting the printing matter by controlling a bias voltage of a developing device according to the printing density which is manually set.

5. The method as set forth in claim 4, wherein the setting of the printing condition comprises:

setting an amount of pages for a single paper or a level of the print rate as the printing condition.

6. An apparatus to control a printing density of an image forming system, the apparatus comprising:

a host computer to display a graphic screen of a printing density setting method including an automatic setting method and a manual setting method, and to set one or more printing conditions and a printing density, the one or more printing conditions including at least one of an amount of pages of a single paper and a print rate, the host computer comprising:

a driver device configured to convert print data according to the one or more printing conditions to generate a printing command and to provide set-up information of the printing density based on the one or more printing conditions, and to output a printing density control signal to control the printing density of the image according to the set-up information of the printing density; and a communication device configured to transmit the print data and the printing density control signal to an external image forming unit to control the printing density of the image, wherein the automatic setting method is automatically setting the printing density of the printing matter to be displayed according to at least one of an amount of pages of a single paper and a print rate so that a pixel interval of the printing matter is changed.

7. The apparatus as set forth in claim 6, wherein the host computer further comprises:

a user interface to generate a window through which the one or more printing conditions and the printing density are set; and the driver device comprises a controller to convert print data according to the printing conditions and to provide set-up information of the printing density so that a printing density control signal is output to control the printing density of the image according to the set-up information of the printing density.

8. An apparatus to control a printing density, the apparatus comprising:

a print device, comprising:

a communication device configured to display a graphic screen of a printing density setting method including an automatic setting method and a manual setting method, and to receive print data to generate an image and to receive set-up information corresponding to the print data, the set-up information including at least one of an amount of pages of a single paper and a print rate of the image, and to determine whether a printing density setting method is at least one of the automatic setting method and the manual setting method and to adjust a printing density according to the set-up information when the printing density setting method is the automatic setting method; and a printing apparatus configured to perform a print job that generates the image having the adjusted printing density according to the print data and the set-up information, wherein the automatic setting method is automatically setting the printing density of the printing matter to be displayed according to at least one of an amount of pages of a single paper and a print rate so that a pixel interval of the printing matter is changed.

9. The apparatus as set forth in claim 8, wherein the printing density is set according to a setup of a print rate and the printing density is increased corresponding to an increased amount of pages.

10. The apparatus as set forth in claim 9, wherein a set-up range of the printing density is restricted based on clarity of a printed matter.

11. The apparatus as set forth in claim 8, wherein the printing apparatus comprises:

a print engine section to perform the print job and thereby form the image on a printing medium and to output a printing density control signal and thereby control the printing density according to the set-up information of the printing density; and a developing device to develop the image by adjusting an amount of toner according to the printing density control signal of the print engine section.

12. The apparatus as set forth in claim 11, further comprising:

a print data controller to convert print data and to provide set-up information.

13. The apparatus as set forth in claim 11, wherein the developing device further comprises a developing roller to which a bias voltage is applied according to the printing density.

14. The apparatus as set forth in claim 8, further comprising:

a host computer connected to the print device to automatically set the printing density according to one or more copies of printed matters on a printing medium.

15. The apparatus as set forth in claim 8, further comprising:

a host computer connected to the print device to automatically set the printing density according to a number of pages of one print job.

16. The apparatus as set forth in claim 8, further comprising:

a host computer connected to the print device to automatically set the printing density according to a print rate.

17. The apparatus as set forth in claim 8, further comprising:

a host computer connected to the print device to set the printing density manually by a user.

* * * * *